United States Patent [19]

Takahashi et al.

[11] Patent Number: 5,156,327
[45] Date of Patent: Oct. 20, 1992

[54] PROCEDURE FOR MOLDING COMPOSITE MATERIALS

[75] Inventors: Akio Takahashi; Syoji Shimizu; Takayuki Tsuzuku, all of Nagoya, Japan

[73] Assignee: Mitsubishi Jukogyo Kabushiki Kaisha, Tokyo, Japan

[21] Appl. No.: 680,505

[22] Filed: Apr. 2, 1991

[30] Foreign Application Priority Data

Apr. 3, 1990 [JP] Japan ................ 2-87496

[51] Int. Cl.$^5$ .............. B32B 3/12; B23K 101/04
[52] U.S. Cl. ................ 228/265; 29/889.72; 428/178
[58] Field of Search ......... 228/173.2, 173.6, 181, 228/185, 265; 29/889.61, 889.72, 890.039, 890.45, 890.46; 52/792; 428/178, 179, 72, 603, 604

[56] References Cited

U.S. PATENT DOCUMENTS

| | | | |
|---|---|---|---|
| 3,388,522 | 6/1968 | Lowes | 428/178 |
| 3,892,902 | 7/1975 | Ilkowicz | 428/179 |
| 3,924,793 | 12/1975 | Summers et al. | 228/181 |
| 3,938,963 | 2/1976 | Hale | 228/181 |
| 4,318,965 | 3/1982 | Blair | 228/173.6 |
| 4,600,053 | 7/1986 | Patel et al. | 29/890.039 |
| 4,824,011 | 4/1989 | Maus et al. | 228/181 |
| 4,996,950 | 3/1991 | Le Mer | 29/890.039 |

FOREIGN PATENT DOCUMENTS

| | | | |
|---|---|---|---|
| 54-18232 | 7/1979 | Japan | 228/181 |
| 438648 | 12/1967 | Switzerland | 52/792 |

OTHER PUBLICATIONS

The Rolls Royce Magazine No. 41, Jun. 1989, pp. 24–27.

*Primary Examiner*—Richard K. Seidel
*Assistant Examiner*—Jeanne M. Elpel
*Attorney, Agent, or Firm*—McAulay Fisher Nissen Goldberg & Kiel

[57] ABSTRACT

The procedure of the present invention may be applied to mold a composite material having a predetermined configuration. The first step of the present procedure is to form the dimples of the core in accordance with a super-plasticizing molding procedure, so that the dimples may exhibit a height higher than that in its final configuration which corresponds with the above-described predetermined configuration, and its top surface is formed in a convexed configuration. Then, pressure is applied to the core to flatten it by forcibly deforming it prior to or at the moment of jointing the skins of the predetermined configuration, so that the dimples may come into contact with the internal surface of the skin at their top surfaces. Thereafter or simultaneously with this operation, the skins of the predetermined configuration are jointed. The composite material formed exhibits an increased operational reliability and an improved dimensional precision in its configuration, without causing the dimples top surface to be out of contact due to a design allowance.

3 Claims, 3 Drawing Sheets

5,156,327

PROCEDURE FOR MOLDING COMPOSITE MATERIALS

FIELD OF THE INVENTION AND RELATED ART STATEMENT

The present invention relates to a procedure for molding a composite material for use in fabricating the light weight ian blade of the gas turbine which may be applied for the future air craft and other industrial fields, along with its application in fabricating other heat insulation panels and various light weight panels.

Traditionally, it has been a common practice to fabricate a composite material upon which dimple cores are formed as a core material utilizing a procedure whereby a sheet 11 having a plurality of dimples 13 formed in a dimple-like configuration thereon in accordance with a super placitizing molding procedure is first made as a core, and then skins 14a, 14b are brought into a position where they may be jointed with opposite sides of the sheet. At this instance, the top end 13a of the dimple 13 is formed in a flattened configuration. A brazing material is applied over the top portion 13a, to be followed by a brazing operation by urging the upper and the lower skins 14a, 14b toward each other and applying a heat, and thereby forming an integral sandwich panel, i.e., a composite material (see FIG. 6) is formed thereby.

OBJECT AND SUMMARY OF THE INVENTION

In the case when the prior art molding procedure for the dimple core sandwitch panel is applied in order to form a fan blade having a predetermined configuration, it may be accompanied with several problems as described below;

(1) The number of dimples increases as the product dimensions are enlarged (In the case of hollow fan blade, for example, more than 1,000 dimples must be formed).

(2) The product may possibly be formed in a configuration with a twist curved surface, and thereby making it difficult to process the die mold which may be used to mold skins and the dimple cores therein.

(3) The above drawbacks lead to a further difficuly in maintaining a precision in the mold processing operation, whereby lowering the molding operational precision of component members (back side skin, web side skin and dimple core).

(4) As a result, although a portion of the dimple head partially comes into contact with the skin, they do not enter into contact with the skin at its portion where it has a rather reduced height, and when this clearance is relatively larger than the thickness of the soldering material, no contact takes place between them.

(5) These problems may not be solved perfectly as long as a plus and a minus allowance system is applied, even if an improvement is accomplished in the precision in the die mold processing operation.

An object of the present invention therefore is to provide a procedure for molding a composite material, which may eliminate the occurance of the problems in the prior art.

In order to solve the above problem, the present invention provides solution means to be described hereinbelow.

That is, the present invention provides a procedure for molding a composite material, wherein the procedure comprises steps of forming a composite material by placitizing a sheet material having a plurality of dimples formed thereon as a core, and jointing skins to the opposite sides of the sheet, wherein the procedure further includes steps of molding said core in accordance with a super placitizing procedure such that the dimples o said core may be formed with an elevated height slightly higher than its final height and its head surface is formed in a convexed curved configuration, and to applying compressive force to the skins to pinch the core and forcibly deforming them to their final height, and thereby flattening the top surface of the dimple, when these skins are jointed.

In the present invention, a material which is used to form a core or skins can be selected from traditional types, such as, a titanium alloy.

The present invention will be described hereinbelow in further details, wherein the procedure of the present invention may be applied to mold a composite material having a predetermined configuration. The first step of the present procedure is to form the dimples of the core in accordance with a super-plasticizing molding procedure, so that the dimples may exhibit a height higher than that in its final configuration which corresponds with the above-described predetermined configuration, and its top surface is formed in a convexed configuration. Then, a pressure is applied to the core to flatten it by forcibly deforming it prior to or at the moment of jointing the skins of the predetermined configuration, so that the dimples may come into contact with the internal surface of the skin at their top surfaces. Thereafter or simultaneously with this operation, the skins of the predetermined configuration are jointed.

In this way, the composite material may be formed having an increased operational reliability and an improved dimensional precision in its configuration, without causing the dimples top surface to be out of contact due to a design allowance.

DETAILED DESCRIPTION OF PREFERRED EMBODIMENTS

Figure 1:
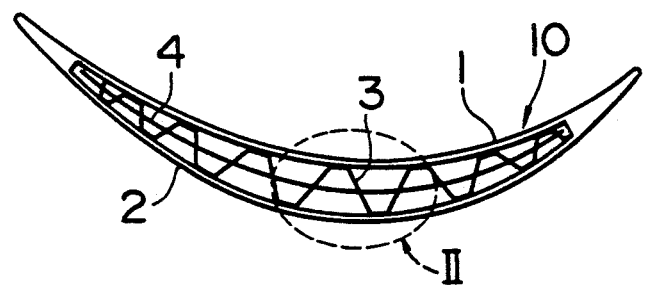
FIG. 1 is a longitudinal cross-sectional view showing a fan blade which has been molded in accordance with one embodiment of the invention.
Figure 2A:
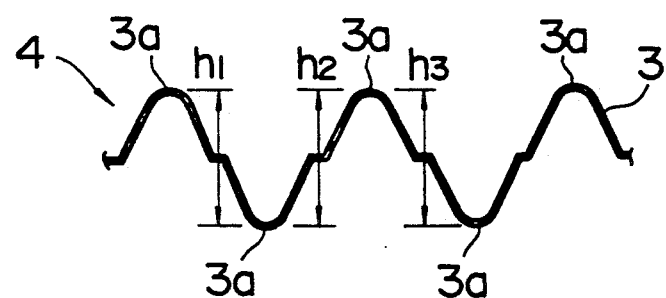
FIG. 2 (a) and (b) are views showing how the embodiment in FIG. 1 operates.
Figure 2B:
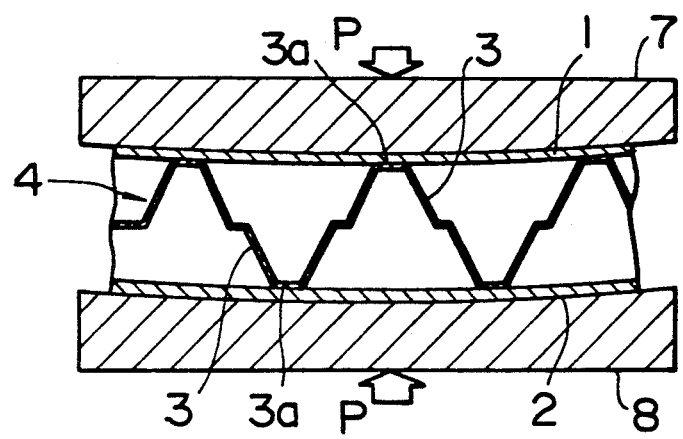

One embodiment of the present invention will be described hereinbelow, with reference to accompanying drawings FIG. 1 through FIG. 3. FIG. 1 is a longitudinal cross-sectional view of the fan blade; FIG. 2 (a) and (b) are detailed views along section II in FIG. 1; and FIG. 3 (a) (b)and (c) are views showing how the present invention operates.

In the meantime, parts or components which have been described relative to a prior art will not be described further to avoid redundancy, and a description will be made mainly with a portion which relates to this invention.

A hollow fan blade 10 such as one, for example, shown in FIG. 1 has a core 4 which is sandwiched to be integral between upper and lower skins 1, 2, each of the skins having the configuration similar to that of the fan blade and also including dimples 3 each of which is formed with a height which matches for the configuration of the skins 1 and 2.

In molding the above composite material, a core is formed in accordance with a super plasiticizing molding process, wherein the core is formed with the heights $h_1$, $h_2$, and $h_3$ (see FIG. 2 (a)) which are elevated by a predetermined dimension relative to the configuration of the skins which have been molded, and the head portion 3a of the core may be formed in a spherical crown-like configuration. Then, upper and lower skins are brought into contact with each other and a compressive force is exerted between them by urging the upper and lower die molds 7, 8, toward each other and thereby forcibly deforming these skins to their final configuration to be taken after the molding operation (see FIG. 2 (b)). Thus, the top portion 3a is flattened to thereby come into contact with the interior surface of the upper and lower skins. Subsequently or simultaneously with this operation, skins 1 and 2 are brazed in position against the top portion 3a.

Figure 3A:
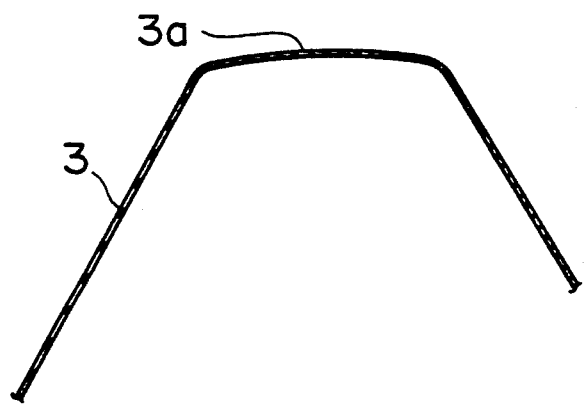
FIG. 3 (a), (b) and (c) are views showing how the embodiment in FIG. 1 operates.
Figure 3B:
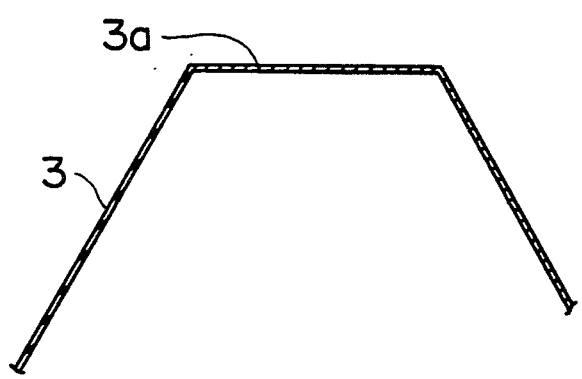
Figure 3C:
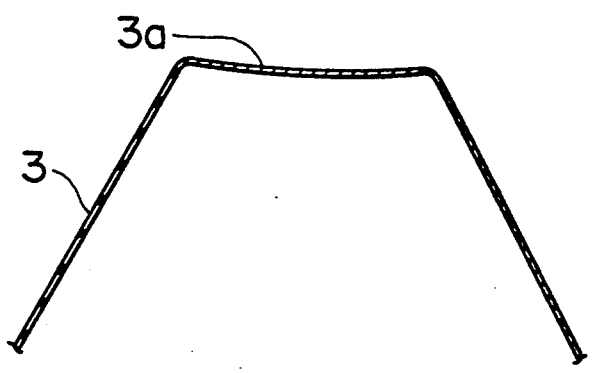
Figure 4:
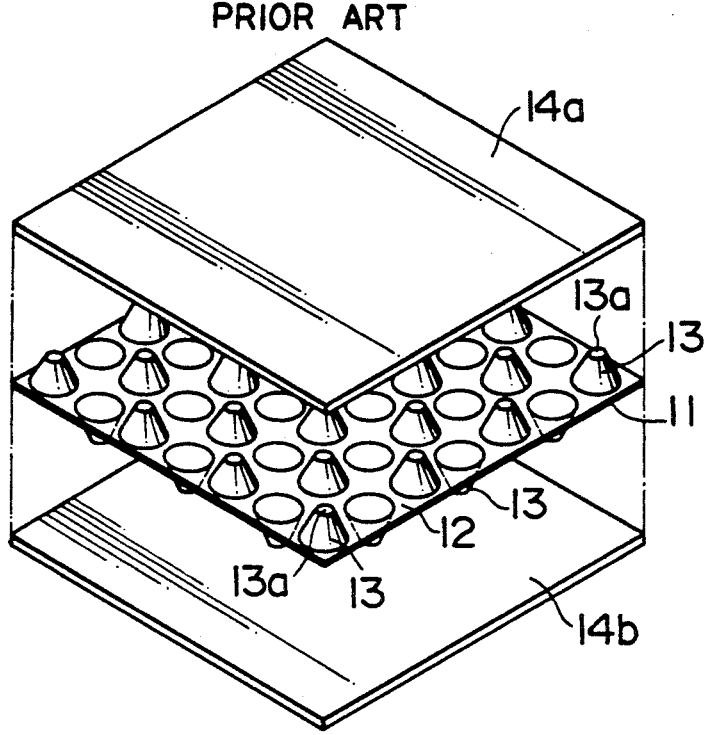
FIG. 4 is a view showing how the prior art device operates.
Figure 5:
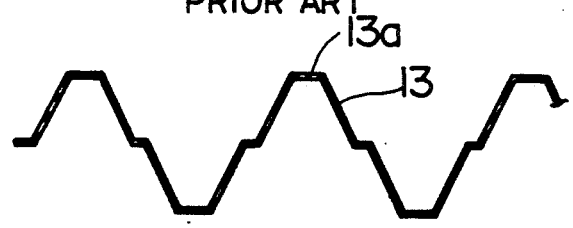
FIG. 5 is a view showing in cross-section a core in a prior art.
Figure 6:
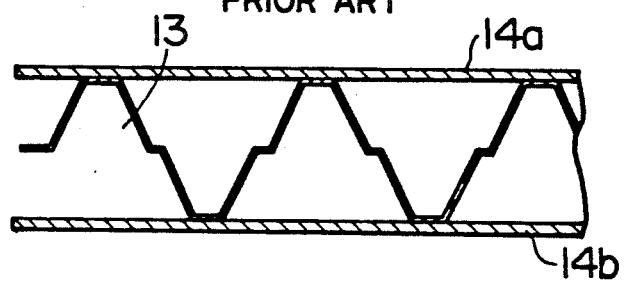
FIG. 6 is a cross-sectional view showing a fan blade having a core comprising prior art dimples.

FIG. 3 (a) shows in cross-section a dimple top portion 3a which has been formed from a sheet material Ti-6Al-4V (thickness 0.4 mm) in accordance with the super plasiticizing procedure. FIG. 3 (b) shows in cross-section a dimple with a top portion which has been flattened after compression. FIG. 3 (c) shows in cross-section a dimple, whose configuration is bowed the other way around when its height exceeds a predetermined dimension and therefore the magnitude of deformation after compression exceeds a predetermined amount.

The above description has been made relative to the skin surface of curved configuration, but alternatively the skin may also be formed in a flattened configuration.

As above-described, even if an accumulated errors are present in the component members, for example, due to the manufacturing errors etc. of the die mold (such errors are unavoidably caused in a practical industrial application), all top surfaces of the dimples may be brought into intimate contact with the internal surface of the skin reliably and thereby remarkably improving the reliability of the jointing operation.

Meanwhile, a scattering jointing procedure may also be possible without using the inserting material, in addition to the brazing procedure by which such inserting material must be interposed in position between portions to be jointed.

As above-described, the procedure of the present invention makes it possible to realize all intimate contact between surfaces, which are needed for the jointing, at all top surfaces of the dimples.

Thus an operational reliability in the jointing step may be substantially improved.

Besides, the dimentional precision in the shape may be accomplished after the molding procedure.

We claim:

1. A method for molding a composite material, wherein said procedure comprises the steps of providing a sheet having a plurality of dimples formed thereon as a core in accordance with a super-plasticizing process, and joining skins to opposite sides of the dimples in order to form a composite material, wherein said procedure further comprises the steps of forming said dimples of said core such that each dimple has a height higher than its final height, and has its top surface formed in a convexed configuration in accordance with a super-plasticizing process and exerting a compressive force on said skins when joining said skins to said dimpled core, forcibly deforming said dimples to their final heights, thereby flattening the top surface of the dimples.

2. The method of claim 1 for molding a composite material, wherein said skins are formed in a curved configuration.

3. The method of claim 1 for molding a composite material, wherein said skins are formed in a plane configuration.

* * * * *